(12) United States Patent
Taagepera

(10) Patent No.: US 9,909,704 B2
(45) Date of Patent: Mar. 6, 2018

(54) NON-WELDED APPARATUS FOR PROVIDING ACCESS TO THE INTERIOR OF AN ENCLOSURE AND METHODS FOR USE THEREOF

(71) Applicant: Chevron U.S.A. Inc., San Ramon, CA (US)

(72) Inventor: Jaan Taagepera, Benicia, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 335 days.

(21) Appl. No.: 14/613,096

(22) Filed: Feb. 3, 2015

(65) Prior Publication Data

US 2016/0223115 A1 Aug. 4, 2016

(51) Int. Cl.
- *F16L 41/00* (2006.01)
- *F16L 41/14* (2006.01)
- *G09F 7/18* (2006.01)

(52) U.S. Cl.
CPC ............. *F16L 41/008* (2013.01); *F16L 41/14* (2013.01); *G09F 7/18* (2013.01)

(58) Field of Classification Search
USPC .. 285/139.1–139.3, 64, 61, 141.1, 192, 193, 285/208, 288.1, 288.3, 288.4; 52/220.8
See application file for complete search history.

(56) References Cited

U.S. PATENT DOCUMENTS

| | | | | |
|---|---|---|---|---|
| 572,911 A | * | 12/1896 | Schmidt | F16L 5/00 137/359 |
| 935,984 A | * | 10/1909 | Hinck | F16L 19/0218 285/208 |
| 1,000,538 A | * | 8/1911 | Mueller | F16L 5/10 285/139.1 |
| 1,107,289 A | * | 8/1914 | Glauber | F16L 5/10 285/139.1 |
| 1,341,828 A | * | 6/1920 | Volckhausen | F16K 15/20 137/223 |
| 1,398,083 A | * | 11/1921 | Tibbetts | F16L 41/001 285/139.2 |
| 1,625,404 A | * | 4/1927 | Wagenseller | E03C 1/0401 285/193 |

(Continued)

FOREIGN PATENT DOCUMENTS

| | | |
|---|---|---|
| JP | 07119885 A | 5/1995 |
| JP | 09030595 A | 2/1997 |

*Primary Examiner* — Aaron M Dunwoody
(74) *Attorney, Agent, or Firm* — Karen R. DiDomenicis

(57) ABSTRACT

Disclosed is a mechanical clamp useful for providing access to the interior of an enclosure such as a pressure vessel. The mechanical clamp is an apparatus having a cap having a convex side and a concave side wherein the concave side is adapted for positioning adjacent the wall of the enclosure. The apparatus further includes at least one rod attached securely in the cap for passing through at least one hole in the wall of the enclosure wherein each rod has a first end attached securely in the cap and a second end and each rod is threaded along a portion of the rod including the second end. The apparatus further includes a nut for attaching to the second end of each rod for securing the cap in place adjacent to the wall of the enclosure. An opening is provided in the cap so that a probe can be passed there through. Methods for applying the mechanical clamp are also disclosed.

3 Claims, 1 Drawing Sheet

(56) References Cited

U.S. PATENT DOCUMENTS

| | | | | | |
|---|---|---|---|---|---|
| 1,734,966 | A | * | 11/1929 | Elmendorf | A01J 11/00 285/138.1 |
| 1,896,216 | A | * | 2/1933 | Brandt | F16L 41/086 285/141.1 |
| 3,830,536 | A | | 8/1974 | Frisch et al. | |
| 4,433,828 | A | | 2/1984 | Spiegelman et al. | |
| 4,654,942 | A | * | 4/1987 | Rush | F16L 31/02 285/197 |
| 4,735,443 | A | * | 4/1988 | Rush | F16L 31/02 285/139.1 |
| 4,887,851 | A | * | 12/1989 | Rush | F16L 41/14 285/139.1 |
| 5,213,378 | A | * | 5/1993 | MacGregor | F16L 41/082 285/141.1 |
| 5,396,525 | A | * | 3/1995 | Domy | G21C 13/036 29/402.06 |
| 5,927,615 | A | * | 7/1999 | Turk | F24F 6/18 239/550 |
| 8,328,240 | B2 | * | 12/2012 | Stone | F16L 41/14 285/139.1 |
| 8,695,291 | B2 | * | 4/2014 | Pisklak | H01L 31/05 136/244 |
| 2008/0067806 | A1 | * | 3/2008 | Truitt | E03C 1/12 285/56 |

* cited by examiner

NON-WELDED APPARATUS FOR PROVIDING ACCESS TO THE INTERIOR OF AN ENCLOSURE AND METHODS FOR USE THEREOF

FIELD

The present disclosure relates to an apparatus for providing access to the interior of an enclosure, and methods for providing access to the interior of the enclosure using the apparatus.

BACKGROUND

There frequently exists a need to create connections to rigid enclosures such as process equipment and piping so that access to the enclosures can be provided. In many cases such enclosures are fabricated of steel and connections are welded to the equipment and piping. However, in certain circumstances welding is undesirable for either metallurgical or plant operations reasons. One means of creating a non-welded connection is by the use of a bolted on assembly, also referred to as a "tapping sleeve," which is placed around the outside of a pipe or other circular equipment, e.g., a pressure vessel. This type of external connection can often be excessively heavy as to be impractical. Furthermore, internal pressure from within the enclosure tends to apply force on the clamped on device which can tend to separate the device from the enclosure and weaken the repair over time. In such cases, a supplemental "strong back" device may be necessary to hold the device in place.

Thus a mechanical means of creating a pressure tight connection by which an enclosure could be accessed would be desirable.

SUMMARY

In one aspect, a first apparatus for providing access to the interior of an enclosure is provided. The apparatus includes a cap having a cap wall having an opening there through. The cap has a convex side and a concave side adapted for positioning adjacent to the wall of the enclosure. The apparatus further includes a rod attached securely in the cap for passing through a hole in the wall of the enclosure wherein the rod has a first end attached securely in the cap and a second end and the rod is threaded along a portion of the rod including the second end and wherein the rod comprises a bore there through in alignment with the opening through the cap wall. A nut is provided for attaching to the second end of the rod for securing the cap in place adjacent the wall of the enclosure.

In another aspect, a method is provided for providing access to the interior of an enclosure. First, a hole is prepared in the wall of the enclosure at a desired location. The above-described apparatus is positioned relative to the wall of the enclosure such that the rod of the apparatus passes through the hole in the wall of the enclosure and the concave side of the cap of the apparatus is adjacent the wall of the enclosure. The apparatus is secured by attaching the nut to second end of the rod. Finally, a probe is passed through the bore of the rod thereby providing access to the interior of the enclosure.

In another aspect, a second apparatus is provided for providing access to the interior of an enclosure. The apparatus includes a cap having a cap wall having an opening there through through which a probe may be passed and further passed through a first hole in the wall of the enclosure, wherein the cap has a convex side and a concave side adapted for positioning adjacent the wall of the enclosure. The apparatus further includes a rod attached securely in the cap for passing through a second hole in the wall of the enclosure wherein the rod has a first end attached securely in the cap and a second end and the rod is threaded along a portion of the rod including the second end. A nut is provided for attaching to the second end of the rod for securing the cap in place adjacent the wall of the enclosure.

In another aspect, a method is provided for providing access to the interior of an enclosure using the second apparatus. The method includes first preparing a first hole in the wall of the enclosure at a desired location for the passage of a probe there through, and preparing a second hole in the wall of the enclosure spaced from the first hole. The second apparatus is positioned relative to the wall of the enclosure such that the rod of the apparatus passes through the second hole in the wall of the enclosure and the concave side of the cap of the apparatus is adjacent the wall of the enclosure. The apparatus is secured in the desired position by attaching the nut to second end of the rod. Finally, a probe is passed through the opening in the cap wall and further through the first hole in the wall of the enclosure thereby providing access to the interior of the enclosure.

DESCRIPTION OF THE DRAWINGS

These and other objects, features and advantages of the present invention will become better understood with reference to the following description, appended claims and accompanying drawings where:

DETAILED DESCRIPTION

The present disclosure relates to an apparatus useful for providing access to the interior of an enclosure. The enclosure can be any of several types of enclosures. In one embodiment, the enclosure is a pressure vessel. Alternatively, the enclosure can be a storage tank, a transport tank, a silo, a pipe, conduit or duct for transporting gas, liquid or multiphase fluids, a furnace, a heat exchanger or an electrostatic precipitator. The enclosure can accommodate a wide range of process conditions. For instance, pressures can range from minor external pressure of about −15 psi (i.e. full vacuum) (−103 kPa) to internal pressure of about 10,000 psi (69 MPa). Temperatures can range from cryogenic (about −300° F. (−184° C.)) to about 1200° F. (649° C.). Throughout the disclosure, the term vessel can be used interchangeably for the more general term enclosure. The enclosure has a wall which generally can have a thickness ranging between about 0.06 inches (1.5 mm) to about 8 inches (20 cm).

Figure 1:
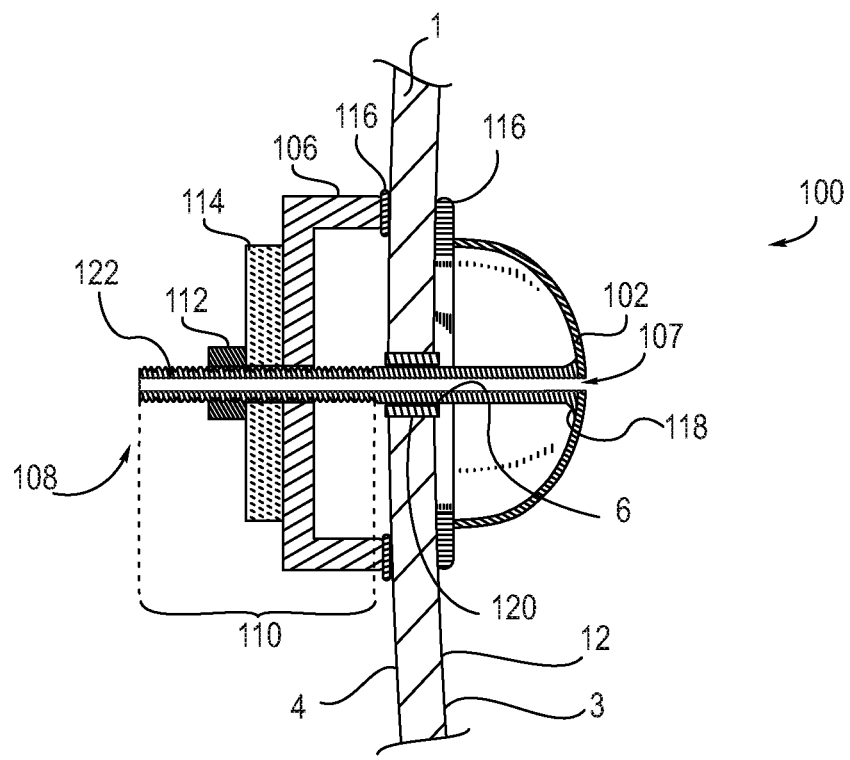
FIG. 1 is a top view of an installed mechanical clamp according to one embodiment.

The apparatus is also referred to herein as a mechanical clamp. Reference is made to the figures to aid in understanding the structure and function of the mechanical clamp. One embodiment of the mechanical clamp 100 as installed on an enclosure wall is illustrated in FIG. 1, showing the mechanical clamp 100 as installed in a top view. Shown is a top view of an enclosure wall 1 having an inner surface 3, an outer surface 4 and an opening 6 there through. In the embodiment illustrated, the enclosure wall 1 has a slight curvature, so that it is apparent that the inner surface 3 faces the interior of the enclosure. The apparatus 100 includes a cap 102 having an opening 107 through the wall of the cap 102. The cap 102 has a convex side and a concave side for positioning adjacent the enclosure wall 1. The specific shape of the cap 102 is not critical. In one embodiment, a pipe end cap fabricated according to ASME B16.9 having a 2:1 semi-elliptical shape can be used. In one embodiment, the diameter of the cap 102 can range from about 0.5 inch (1.3 cm) to about 12 inches (30 cm), and the thickness of the wall of the cap 102 can range from about 0.6 inch (1.5 cm) to about 3.0 inches (7.6 cm). In some embodiments, the cap 102 is formed with a contour to match the surface of the vessel wall 12 to which will be applied.

A threaded rod 108 is attached securely in the cap 102. In one embodiment, the rod 108 is threaded along a portion of the length thereof including the free end of the rod 108. The rod 108 can also be threaded along its entire length. In one embodiment, the threaded rod 108 has a bore 122 along the length thereof which aligns with the opening 107 in the cap 102.

The apparatus 100 further includes a nut 112 for attaching to the free end of the rod 108 for securing the cap 102 in place adjacent the enclosure wall 1. Optionally, the apparatus 100 further includes a washer 114 adjacent the nut 112. The apparatus 100 can be formed of any suitable rigid material, e.g., steel.

The rod 108 can be attached securely in the cap 102 by welding 118. Alternatively, a plate or nut having an opening there through (not shown) and having internal threads to receive a threaded end of the rod 108 can be welded on the concave side of the cap 102.

In one embodiment (not shown), the mechanical clamp 100 includes a plurality of rods 108 as described above for passing through a plurality of holes in the vessel wall 1. The number of rods 108 can vary depending on the area in the vessel wall where the mechanical clamp will be applied. The mechanical clamp 100 can be fabricated with rods 108 corresponding to the arrangement of the plurality of holes in the vessel wall.

In one embodiment, the cap 102 includes at least one optional port (not shown) through which a sealant can be introduced into the apparatus when additional sealing of the mechanical clamp is desired. The port can be a threaded port. For instance, an integrally reinforced threaded branch connection can be welded in place to the cap 102, thereby providing sufficient reinforcement for the hole as well as a threaded connection to which a threaded pipe can be attached. An example of such connections is available from Bonney Forge Corporation (Mt. Union, Pa.) under the trade name Thredolet™.

In one embodiment, the apparatus 100 further includes an optional channel 106 for positioning between the wall 1 and the nut 112/optional washer 114, having an opening there through through which the rod 108 can pass. The channel 106 is provided to spread the load. By "channel" is meant any rigid structural member, including a plate that can be placed perpendicular to the rod 108. In one embodiment, the channel 106 is a structural member having a U-shaped cross-section as shown in the top view in FIG. 1. An advantage to this shape is that it can easily accommodate a curved enclosure wall 1, since the channel 106 only makes contact with the wall 1 at two locations. Alternatively, the channel can have other cross-sectional shapes, such as I-, H- or W-shapes. In one embodiment, the channel 106 can be a C3×5 or a C3×6 structural shape, having a length between about 2 inches (5 cm) and about 36 inches (91 cm) and a hole centered on the web thereof to accommodate the rod 108. Another advantage of the shape of the channel 106 shown in FIG. 1 is that the space within the channel 106 can be filled with sealant 15 if desired as protection against leaks. If this is desired, the channel 106 can include at least one optional opening (not shown) through which the sealant can be introduced into the channel 106.

Optional gasket material 116 can be provided for positioning between the cap 102 and the wall 1 and/or between the channel 106 and the wall 1. Optional packing material 120 can be provided between the rod 108 and the opening 6 in the wall 1. If packing material 120 is present, the rod 108 is preferably unthreaded where the packing material 120 contacts the rod 108.

In one embodiment, a method for providing access to the interior of an enclosure using the above-described apparatus is provided. A hole is first prepared in the wall at a desired location. This can be accomplished by drilling or any other suitable means. The hole 6 needs to be sufficient in size to accommodate the diameter of the rod 108 of the apparatus 100 which will pass therethrough. In one embodiment, the diameter of the hole 6 can be from about ⅛ inch (3.2 mm) to about 4 inches (10 cm).

Next, after cleaning the vessel wall surface onto which the clamp will be positioned, the mechanical clamp 100 is positioned in the desired location for installation. In one embodiment, the cap 102 is positioned such that the concave side is adjacent, i.e., faces, the wall of the enclosure and the free end of the rod 108 passes through the hole 6 in the wall 1. In one embodiment, the cap 102 is positioned on the interior of the enclosure. Alternatively, the cap 102 can be positioned on the exterior of the enclosure.

In order to secure the cap 102 in the desired location, the nut 112 is attached to the rod 108. An optional washer or flat plate 114 can be provided adjacent the nut 112. Finally, a probe 117 can be passed through the opening 107 and the bore 122. The probe 117 can be any suitable means to investigate the interior of the vessel, such as a wire connected to a sensor.

Figure 2:
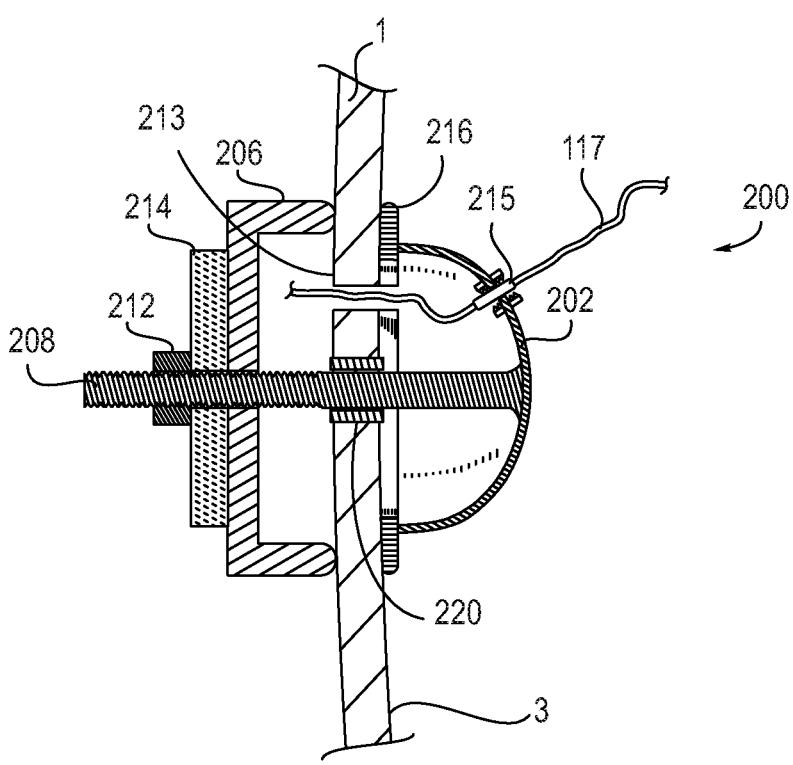
FIG. 2 is a top view of an installed mechanical clamp according to another embodiment.

In another embodiment, another apparatus is disclosed for providing access to the interior of an enclosure. The apparatus 200 as installed on the wall 1 of an enclosure is shown in FIG. 2. The apparatus 200 differs from the apparatus 100 in that the threaded rod 208 is solid rather than having a bore therethrough. An opening 215 is provided in the cap 202 having a diameter sufficient to pass a probe 117 therethrough. In one embodiment, the cap 202 includes at least one optional port (not shown) through which a sealant can be introduced into the apparatus when additional sealing of the mechanical clamp is desired. Such ports can be ports 104 as described above and shown in FIG. 1.

In one embodiment, as in apparatus 100, the apparatus 200 further includes an optional channel 206 for positioning between the wall 1 and the nut 212/optional washer 214, having an opening there through through which the rod 208 can pass.

Also as in apparatus 100, optional gasket material 216 can be provided for positioning between the cap 202 and the wall 1 and/or between the channel 206 and the wall 1. Optional packing material 220 can be provided between the rod 208 and the opening 6 in the wall 1.

In a further embodiment, a method for providing access to the interior of an enclosure using the above-described apparatus 200 is provided. Again referring to FIG. 2, a first hole 213 is prepared in the wall 1 at a desired location. This can be accomplished by drilling or any other suitable means. The hole 213 needs to be sufficient in size to pass a probe 117 there through. A second hole 6 is prepared in the wall 1 at a desirable distance from the first hole 213 as could be determined by one skilled in the art. The diameter of the second hole 6 must be sufficient to accommodate the diameter of the rod 208 of the apparatus 200 which will pass there through. In one embodiment, the diameter of the hole 6 can be from about ⅛ inch (32 mm) to about 4 inches (10 cm).

Next, after cleaning the vessel wall surface onto which the clamp will be positioned, the mechanical clamp 200 is positioned in the desired location for installation. In one embodiment, the cap 202 is positioned such that the concave side is adjacent, i.e., faces, the wall of the enclosure and the free end of the rod 208 passes through the hole 6 in the wall 1. In one embodiment, the cap 202 is positioned on the interior of the enclosure. Alternatively, the cap 202 can be positioned on the exterior of the enclosure.

In order to secure the cap 202 in the desired location, the nut 212 is attached to the rod 208. An optional washer or flat plate 214 can be provided adjacent the nut 212. Finally, a probe 117 can be passed through the opening 215 and the hole 213, thus providing access to the interior of the enclosure. In the embodiment illustrated, the probe 117 can pass through the open side of the channel 206. Alternatively, a hole can be provided in the channel 206 through which the probe 117 can pass.

Advantageously, no post weld heat treatment is required in the field, as no welding is required on the installed mechanical clamp. Any post weld heat treatment needed on the clamp can be performed on the clamp in the fabrication shop prior to installation.

It should be noted that only the components relevant to the disclosure are shown in the figures, and that other components normally part of a mechanical clamp may not be not shown for simplicity.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. An apparatus for providing access to the interior of an enclosure, comprising:
   a. a cap having a cap wall having an opening there through, wherein the cap has a convex side and a concave side adapted for positioning adjacent the wall of the enclosure;
   b. a rod attached securely in the cap for passing through a hole in the wall of the enclosure, wherein:
      i. the rod has a first end and a second end;
      ii. the rod is threaded along a portion of the rod including the second end;
      iii. the rod comprises a bore there through in alignment with the opening through the cap wall;
      iv. the first end of the rod is attached securely in the cap by welding to the cap;
   c. a nut for attaching to the second end of the rod for securing the cap in place adjacent the wall of the enclosure; and
   d. a washer for positioning between the wall of the enclosure and the nut.

2. The apparatus of claim 1, further comprising a channel for positioning between the wall of the enclosure and the nut.

3. An apparatus for providing access to the interior of an enclosure, comprising:
   a. a cap having a cap wall having an opening there through, wherein the cap has a convex side and a concave side adapted for positioning adjacent the wall of the enclosure;
   b. a rod attached securely in the cap for passing through a hole in the wall of the enclosure, wherein:
      i. the rod has a first end and a second end;
      ii. the rod is threaded along a portion of the rod including the second end;
      iii. the rod comprises a bore there through in alignment with the opening through the cap wall;
      iv. the first end of the rod is attached securely in the cap by welding to the cap;
   c. a nut for attaching to the second end of the rod for securing the cap in place adjacent the wall of the enclosure; and
   d. gasket material for positioning between the cap and the wall of the enclosure.

* * * * *